United States Patent [19]

Uhlmann

[11] Patent Number: 4,479,748
[45] Date of Patent: Oct. 30, 1984

[54] SCREW-AND-NUT UNIT OR SCREW JOINT

[76] Inventor: Jack Uhlmann, Köpmansgatan 14, S-302 42 Halmstad, Sweden

[21] Appl. No.: 253,530
[22] PCT Filed: Aug. 12, 1980
[86] PCT No.: PCT/SE80/00203
   § 371 Date: Apr. 9, 1981
   § 102(e) Date: Apr. 9, 1981
[87] PCT Pub. No.: WO81/00603
   PCT Pub. Date: Mar. 5, 1981

[30] Foreign Application Priority Data

Aug. 14, 1979 [SE] Sweden ................................ 7906770

[51] Int. Cl.³ ........................ F16B 33/02; F16B 37/08
[52] U.S. Cl. .................................... 411/412; 411/421; 411/437
[58] Field of Search .............. 411/241, 242, 244, 245, 411/223, 321, 333, 411, 412, 413, 417, 420, 421, 436, 437; 269/177, 184

[56] References Cited

U.S. PATENT DOCUMENTS 476,316  6/1892 Rodgers ............................. 411/223
506,485 10/1893 Fichner ............................. 411/245
1,296,038  3/1919 Baker ................................ 411/242

FOREIGN PATENT DOCUMENTS 2043274  3/1972 Fed. Rep. of Germany ...... 411/411
403686 10/1909 France ............................. 411/245
425148  3/1911 France ............................. 411/321
  9017 of 1911 United Kingdom ................ 411/333

Primary Examiner—Thomas J. Holko
Attorney, Agent, or Firm—Cushman, Darby & Cushman

[57] ABSTRACT

The invention is a screw and nut assembly having a particular thread configuration. The externally threaded spindle has both a spiral threaded portion and a spiral non-threaded portion which separates the convolutions of the threaded portion. The threaded portion includes a plurality of individual threads, each individual thread extending only over a part of the periphery of the spindle body. The nut member also includes a spiral threaded portion and a spiral non threaded portion which nut portions match the respective portions of the spindle. Because of this arrangement, the nut may be rapidly moved along the spindle body when their respective non-threaded portion are engaged. Thereafter, the nut may be turned so as to engage its threaded portion with the threaded portion of the spindle.

1 Claim, 4 Drawing Figures

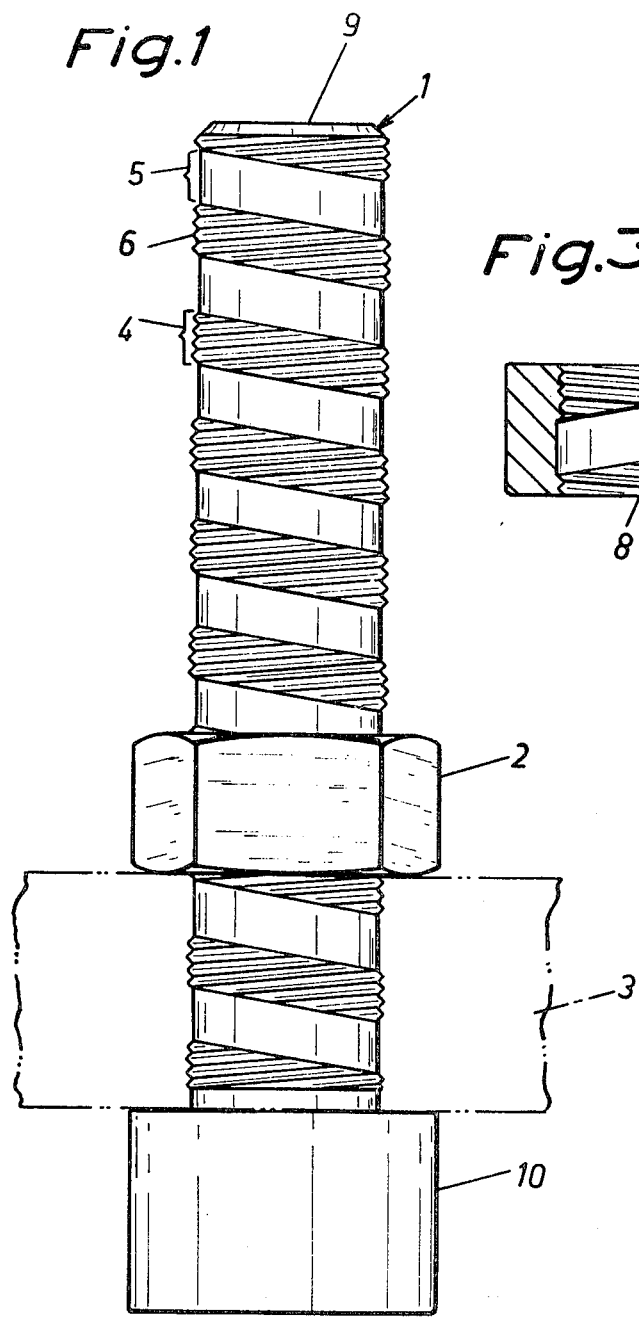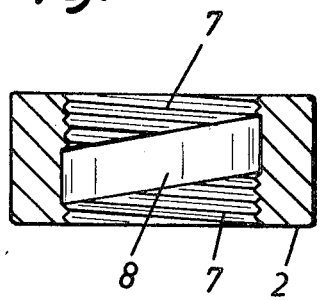

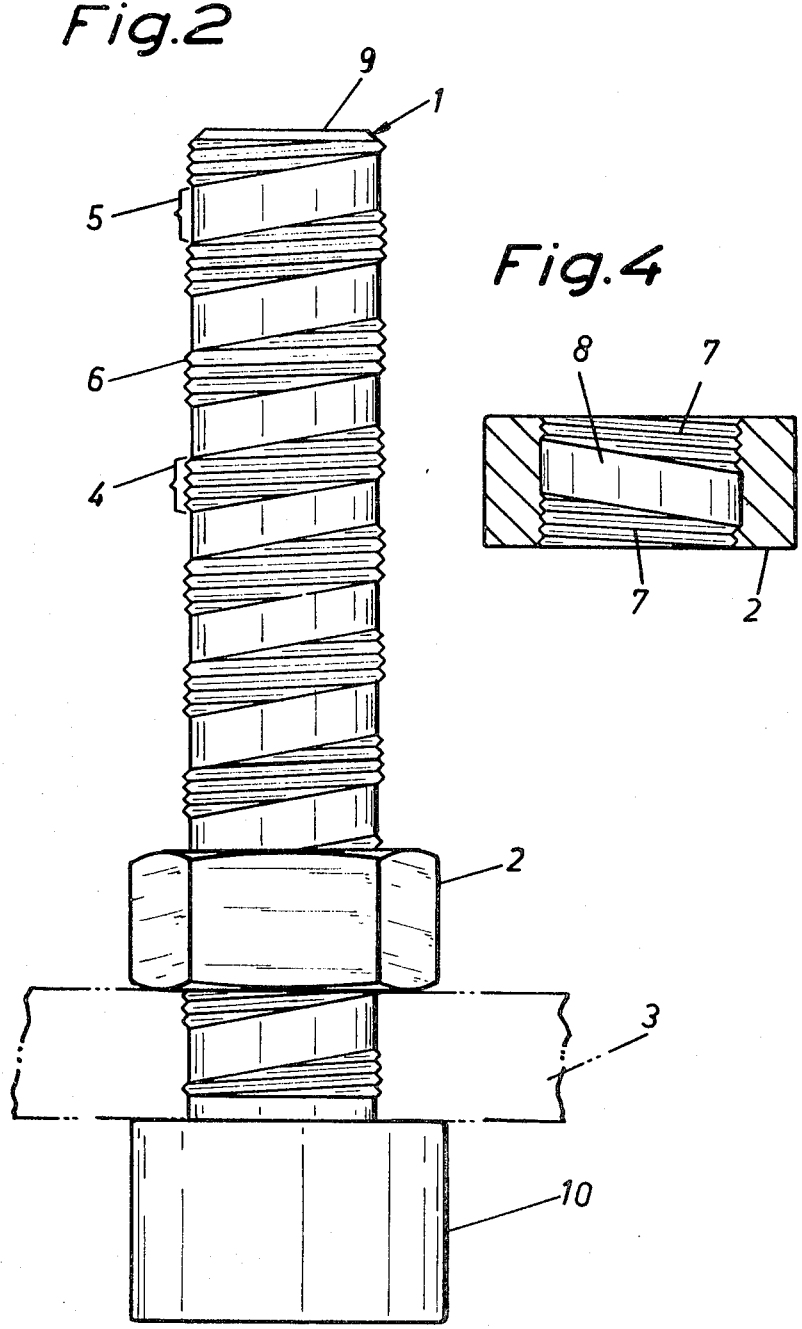

SCREW-AND-NUT UNIT OR SCREW JOINT

The subject invention relates to screws and screw joints of the kind comprising a screw spindle body formed with at least one non-threaded section extending along the spindle body, and at least one nut member formed with a threaded section which matches the non-threaded section on the screw spindle body. The screw spindle body and the nut member are arranged to move axially relative to one another, during which movements the threaded nut member section travels along the non-threaded section of the screw spindle body. The screw spindle and the nut member may also be turned relative to one another to effect engagement between said nut member section and the threads of the screw spindle body.

Screw spindles and screw joints of this type permit rapid displacement of the screw spindle body and nut member axially relative to one another, thus giving a quick grip and a quick release action, and screw spindles and screw joints of this kind may be used for instance in vices or valves adapted to shut off large flows quickly.

One problem inherent in screw joints of this kind is that removal of the threads on one or several sections of the screw body and the nut member results in a considerable reduction of the strength of the screw joint. The screw spindle threads, being the weakest ones, are those most exposed to stress. Another problem is the difficulty in obtaining, in a resonable manner, an advantageous distribution of the area of thread engagement over the periphery of the screw spindle body. The most common solution to this latter problem is to divide the threaded portion into two, three or four sections which are distributed symmetrically over the periphery. However, this arrangement adds considerably to the manufacturing costs and in addition weakens the threads further, since each screw thread in each section requires two bevelled entrances. Furthermore, additional portions of the faces of engagement of the threads cannot either be used because of the clearance that is required between the threaded sections of the screw spindle body and the nut member. Such clearance is necessary, as any dirt or dust particles that might enter between the screw spindle body and the nut member could otherwise easily interfere with the operation of the screw or screw joint. An additional disadvantage with the provision of several threaded sections is that it increases the number of angular positions in which the threads are completely out of mesh, and the consequence is a reduction of the circumferential length over which grip is possible.

The purpose of the invention is to eliminate the disadvantages outlined above in screws and screw joints of the kind referred to. The subject invention provides a screw joint possessing considerably enhanced gripping strength compared with prior-art screw joints of this type.

In accordance with the teachings of the invention, this is achieved in that the non-threaded section of the screw spindle body as well as the threaded section on the nut member extend helically along the screw spindle body and the nut member, respectively.

The invention will be described in closer detail in the following with reference to some embodiments thereof illustrated in the accompanying drawings, wherein FIG. 1 is a lateral view of a screw joint in accordance with the invention, showing a first embodiment thereof, FIG. 2 is a lateral view of the screw joint in accordance with a second embodiment, and FIGS. 3 and 4 are sectional views of nut members cooperating with the screw joints shown respectively in FIG. 1 and in FIG. 2.

The screw joint of FIG. 1 consists of a screw spindle body 1 and a nut member 2 and they are illustrated in their tightened positions on either side of a work piece 3. In accordance with the invention, the screw spindle body is formed with a threaded portion 4 extending around the screw spindle along the entire length thereof, as well as with a section 5 which is not threaded and which extends helically around the screw spindle body, separating the threads thereon. The section 5 forms a helical spiral the pitch of which along the screw spindle body considerably exceeds the pitch of the individual screw threads 6. For this reason each individual screw thread 6 extends only over a part of the periphery of the screw body 1. In the two embodiments illustrated herein, the threaded portion 4 and the nonthreaded section 5 have been given the same width.

The inner face of the nut member 2, most clearly illustrated in FIG. 3, is formed with screw threads 7 and with a non-threaded section 8 matching respectively the threads and the non-threaded section of the screw spindle body 1. Consequently, the nut member 2 may be applied over the tip 9 of the screw spindle, entering either the screw threads 6 or the section 5, and be moved along the screw spindle body 1, sliding in section 5, and the nut may thereafter be turned into engagement with the threads 6 in any chosen thread entrance. When the threads 6 and 7 are not in engagement, the nut member 2 can slide along the screw spindle body while performing a rotating movement, its screw threads 7 positioned in section 5 and the screw spindle threads 6 positioned in nut section 8.

Upon tightening, the shearing stress exerted on the screw threads 6 and 7 will be distributed over the cooperating faces of the two bodies, both along the periphery of the screw spindle body and in the axial direction. A strong bond is obtained in this manner. In a conventional screw joint of the kind that does not have the quick grip and quick release function referred to, the load and shearing stress will be exerted primarily on that screw joint thread with which engagement is first effected. In the screw joint in accordance with the subject invention, on the other hand, the shearing stress will be more evenly distributed in the axial direction, which enhances the general strength of the screw joint.

The screw joint in accordance with the first embodiment illustrated in FIGS. 1 and 3 is formed with right-hand screw threads 6 and with a left-hand non-threaded section 5. In this embodiment, rapid displacement in the direction towards the head 10 of the screw spindle body is achieved when the nut member is turned to the left, i.e. counter-clockwise, whereafter tightening and locking is effected by turning the nut member to the right, i.e. clockwise.

The screw threads and the non-threaded section could both be either left-hand or right-hand ones, and this latter embodiment is illustrated in FIGS. 2 and 4. The various details of this embodiment have been given the same numeral references as those of the previous embodiments. One advantage of this embodiment over the one shown in FIGS. 1 and 2 is that, given otherwise identical conditions, that is the same width of the threaded portion 4 and the same thread pitch, the individual screw thread 6 may extend over more than half a turn around the circumferential length of the screw spindle body 1, whereas in accordance with the embodiment of FIGS. 1 and 2, the screw thread extends over a circumferential length that is less than 180°.

In accordance with a further development of the invention, the nut member could consist of two or more interacting nuts. While assuming relative angular end positions, the nuts can be displaced rapidly together along the screw spindle body, their screw threads sliding in the non-threaded section 5. After the nuts have been turned relative to one another to opposite relative angular positions, the screw threads in the nuts will run in continuous engagement in the screw threads 6 of the screw body 1. Together, these screw threads then cover the entire or major portion of the periphery of the screw spindle body, such that at any one time one or several nuts will engage in the screw threads 6 of the screw spindle body.

Another possible further development is to provide one of the two cooperating nuts with a trapezoidal screw thread which is able to slide only on the section 5. The other nut, formed like those already described herein, will be able to turn relative to the first nut into and out of engagement with the screw threads 6 of the screw spindle body.

The invention is not limited to the embodiments described and referred to in the aforegoing but several modifications are possible within the scope of the appended claims. For instance, the screw spindle body 1 and the nut member 2 could serve as the cooperating members of a vice, a lifting jack, sliding valve or the like. Roller bodies could be inserted between the screw and the nut parts to reduce the frictional forces. The screw threads as well as the non-threaded sections could have a pitch that differs from that shown herein and a larger number of entrances could be provided both on the spindle and on the nut member. The threaded portions 4, 7 and the non-threaded sections 5, 8 need not have the same axial width. This might be advantageous as it adds to strength and durability, because the various screw threads on the screw body 1 and on the nut member 2 thus obtained equivalent strength characteristics.

I claim:

1. A screw and nut assembly comprising a screw spindle body having a spiral external threaded portion along its length and a spiral external non-threaded portion separating the convolutions of the threaded portion and having a plurality of individual threads, the spiral threaded portion having a greater pitch than the individual threads and each individual thread extending only over a part of the periphery of the spindle body, and a nut member having a spiral internal threaded portion which matches the spiral non-threaded portion of the spindle body and spiral internal non-threaded portion, the internal threaded portion having a plurality of individual threads which match the individual threads on the spindle body, the arrangement being such that when the nut threads and the spindle threads are not in engagement the nut threads are positioned in the non-threaded spindle portion and the spindle threads are positioned in the non-threaded nut portion whereby the nut member can be rapidly moved along the spindle body by rotation of the nut member relative to the spindle body and whereby the nut member may thereafter be turned to engage its threads with the spindle threads.

* * * * *